United States Patent [19]
Kitamoto et al.

[11] 4,439,795
[45] Mar. 27, 1984

[54] MAGNETIC RECORDING MEDIUM

[75] Inventors: Tatsuji Kitamoto; Goro Akashi, both of Odawara, Japan

[73] Assignee: Fuji Photo Film Co., Ltd., Kanagawa, Japan

[21] Appl. No.: 329,098

[22] Filed: Dec. 9, 1981

[30] Foreign Application Priority Data

Dec. 11, 1980 [JP] Japan ................ 55-174983

[51] Int. Cl.$^3$ ............ G11B 5/74; H01F 1/02; B05D 5/12; B32B 7/02
[52] U.S. Cl. .................... 360/131; 148/105; 360/134; 427/131; 428/551
[58] Field of Search ............ 360/131, 134, 135, 56, 360/57; 148/31.57, 105; 428/611, 928; 75/0.5 AA; 427/127, 131

[56] References Cited

U.S. PATENT DOCUMENTS

| | | | |
|---|---|---|---|
| 3,761,311 | 9/1973 | Perrington | 360/134 |
| 3,855,016 | 12/1974 | Ehrreich | 360/131 |
| 4,072,501 | 2/1978 | Quinby | 75/0.5 AA |
| 4,075,384 | 2/1978 | Suzuki | 360/131 |
| 4,237,506 | 12/1980 | Manly | 148/105 |
| 4,246,316 | 1/1981 | Aonuma | 428/551 |
| 4,259,392 | 3/1981 | Suzuki | 427/131 |
| 4,307,156 | 12/1981 | Yanagisawa | 427/131 |

Primary Examiner—Robert M. Kilgore
Attorney, Agent, or Firm—Sughrue, Mion, Zinn, MacPeak & Seas

[57] ABSTRACT

A magnetic recording medium is described having formed on a non-magnetic base at least two magnetic layers, each of the magnetic layers comprising ferromagnetic particles dispersed in a binder, wherein the ferromagnetic particles in the outermost layer have an average length of $0.3\mu$ or less and a length to width ratio of greater than 1/1 but not greater than 3/1, and the ferromagnetic particles in an underlying layer have a length to width ratio of more than 3/1.

3 Claims, No Drawings

MAGNETIC RECORDING MEDIUM

FIELD OF THE INVENTION

This invention relates to a magnetic recording medium, and more particularly, to a magnetic recording medium having high S/N (signal to noise) ratio in high-density recording, and which is free from low reproduction output in low-density recording.

BACKGROUND OF THE INVENTION

Many studies have been made to increase the recording density of magnetic recording media (i.e., [the relative speed of tape and head]/[maximum frequency of recording signals]) so as to make high-fidelity audio cassettes and low-speed small video tapes.

The proposals made to date include increasing the coercive force of the magnetic layer, increasing both the residual magnetization and coercive force (as in a metal tape), and increasing the coercive force of an upper magnetic layer.

Vertical magnetic recording has also been proposed wherein a residual magnetizable component in a direction normal to the plane of the magnetic recording medium is effectively utilized. According to this method, the recording density as defined above is increased, and when the recording wavelength is made smaller than the thickness of the recording layer, there is no further reduction in output due to self-demagnetization ("self-demagnetization" means the decrease in residual magnetization due a self-demagnetizing field that is established between the N-S poles, created by its own residual magnetization, and that exists in a direction opposite to that of its magnetization so as to offset the latter, and the magnitude of self-demagnetization is increased with decreasing distance between the N-S poles). Thus, this method is said to be effective in high-density recording in a region where the recording wavelength is less than 1 or 2 microns.

Another proposal is to utilize a magnetic layer of a coated type containing a magnetizable component extending obliquely or normally to the magnetic surface. See U.S. Pat. Nos. 3,052,567 and 3,185,775, and Japanese Patent Publication No. 15203/74.

SUMMARY OF THE INVENTION

One object of this invention is to provide a magnetic recording medium having high S/N ratio in high-density recording and which is free from reduced reproduction output in low-density recording.

As a result of extensive studies to attain this object, we have found that both the residual magnetic susceptibility in a vertical direction and the S/N ratio in high-density recording can be increased by using ferromagnetic particles having an average length of $0.3\mu$ or less and having a length to width ratio of greater than 1/1 but not greater than 3/1. We have also found that a magnetic layer made of these ferromagnetic particles achieves high recording sensitivity at short wavelengths using a smallgap head but achieves a very low sensitivity at long wavelengths (i.e., in low frequency range), and that this defect can be eliminated by using a magnetic layer of two or more sublayers and by orienting acicular ferromagnetic particles having a length to width ratio of more than 3/1 in a layer other than the outermost layer, in a direction parallel to the magnetic surface.

Therefore, this invention provides a magnetic recording medium having formed on a non-magnetic base at least two magnetic layers, each comprising ferromagnetic particles dispersed in a binder, wherein the ferromagnetic particles in the outermost magnetic layer (i.e., the farthest from the base) have an average length of $0.3\mu$ or less and a length to width ratio of greater than 1/1 but not greater than 3/1, and the ferromagnetic particles in an underlying magnetic layer having a length to width ratio of more than 3/1.

DETAILED DESCRIPTION OF THE INVENTION

The magnetic recording medium of this invention has a number of advantages over the prior art products described above. By using rod-shaped (or cylindrical) ferromagnetic particles of not more than $0.3\mu$ in length in the outermost magnetic layer, the noise level due to discontinuous magnetization caused by the presence of large particles is reduced, and by controlling the length to width ratio of the particles to be within the range greater than 1/1 but not greater than 3/1, the tendency of the particles to be oriented as they lie on the plane of the magnetic layer, for example, the disposition to be oriented parallel to the magnetic surface due to a reduced magnetic layer thickness that occurs during application or drying of a coating solution, or the disposition to be oriented in the direction in which the coating solution is cast, can be minimized. Also, if desired, the particles can be given a disposition to be oriented normal to the magnetic surface so as to provide great residual magnetization normal to the magnetic surface. As another advantage, the underlying magnetic layer is made of ferromagnetic particles having a high length to width ratio so as to achieve high sensitivity at low wavelengths.

When the magnetic recording medium of this invention has three or more magnetic layers, the above requirements may be met by the outermost layer and at least one of the underlying layers.

The ferromagnetic particles used in the outermost layer and the underlying layer of this invention are any known fine ferromagnetic particles, such as $\gamma$-$Fe_2O_3$, Co-containing $\gamma$-$Fe_2O_3$, $Fe_3O_4$, Co-containing $Fe_3O_4$, $CrO_2$, Co-Ni-P alloy, and Co-Ni-Fe alloy, specific examples of which are described in Japanese Patent Publication Nos. 14090/69, 18372/70, 22062/72, 22513/72, 28466/71, 38755/71, 4286/72, 12422/72, 17284/72, 18509/72, 18573/72, and U.S. Pat. No. 3,865,627.

The non-magnetic binder used in this invention may be a thermoplastic resin or a thermosetting (reactive) resin. Suitable thermoplastic resins have a softening point of less than 150° C., and average molecular weight of about 10,000 to 200,000, and a degree of polymerization of about 100 to 1000. Examples of such polymers are vinyl chloride/vinyl acetate copolymer, vinyl chloride/vinylidene chloride copolymer, vinyl chloride/acrylonitrile copolymer, acrylic acid ester/acrylonitrile copolymer, acrylic acid ester/vinylidene chloride copolymer, acrylic acid ester/styrene copolymer, methacrylic acid ester/acrylonitrile copolymer, methacrylic acid ester/vinylidene chloride copolymer, methacrylic acid ester/styrene copolymer, urethane elastomer, polyvinyl fluoride, vinylidene chloride/acrylonitrile copolymer butadiene/acrylonitrile copolymer, polyamide resin, polyvinyl butyral, cellulose derivative (e.g., cellulose acetate butyrate, cellulose diacetate, cellulose triacetate, cellulose propionate, or nitrocellulose), styrene/- butadiene copolymer, polyester resin, chlorovinyl ether/acrylic acid ester copolymer, amino resins, various synthetic rubber thermoplastic resins and mixtures thereof.

Specific examples of such resins are described in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, and 27886/72.

The thermosetting (reactive) resin is such that it has a molecular weight of less than 200,000 when it is in coating solution and that after application and drying of a coating solution, its molecular weight is increased infinitely due to condensation, addition or other reactions. Preferred thermosetting (reactive) resins are those which do not soften or melt until they are decomposed with heat. Specific examples are phenolic resins, epoxy resins, polyurethane curable resin, urea resin, melamine resin, alkyd resin, silicone resin, acrylic reactive resin, epoxypolyamide resin, nitrocellulose melamine resin, a mixture of high molecular weight polyester resin and isocyanate prepolymer, a mixture of methacrylic acid salt copolymer and diisocyanate prepolymer, a mixture of polyester polyol and polyisocyanate, urea-formaldehyde resin, low-molecular weight glycol/high-molecular weight diol/triphenylmethane triisocyanate mixture, polyamine resins and mixtures thereof.

Specific examples of these resins are found in Japanese Patent Publication Nos. 8130/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72 and 28922/72.

These binders are used alone or in admixture, and they may also be combined with additives. The weight ratio of the ferromagnetic particles to the binder is in the range of from 10 to 200 parts by weight of the binder to 100 parts by weight of the ferromagnetic particles. Examples of additives are a dispersant, lubricant and abrasive.

Examples of the dispersants include aliphatic acids having from 12 to 18 carbon atoms ($R_1COOH$ wherein $R_1$ is an alkyl group having from 11 to 17 carbon atoms) such as caprylic acid, capric acid, lauric acid, myristic acid, palmitic acid, stearic acid, oleic acid, elaidic acid, linoleic acid, linolenic acid, and stearolic acid. Metal soaps made of alkali metals (Li, Na, K, etc.) or alkaline earth metals (Mg, Ca, Ba, etc.) of these aliphatic acids, as well as lecithins may also be used as the dispersant. Higher alcohols having 12 or more carbon atoms, as well as sulfate esters of these alcohols are also usable. These dispersants are typically used in an amount of from 1 to 20 parts by weight for 100 parts by weight of the binder. Illustrative dispersants are described in Japanese Patent Publication Nos. 28369/64, 17945/69, and 15001/73, and U.S. Pat. Nos. 3,387,993 and 3,470,021.

Examples of lubricants include silicone oil, graphite, molybdenum dissulfide, tungsten disulfide, aliphatic acid esters formed from monobasic aliphatic acids having from 12 to 16 carbon atoms and monovalent alcohols having from 3 to 12 carbon atoms, and aliphatic acid esters of monobasic aliphatic acids having 17 or more carbon atoms and monovalent alcohols having a number of carbon atoms such that the number added to the number of carbon atoms in the aliphatic acids totals from 21 to 23. These lubricants are typically used in an amount of 0.2 to 20 parts by weight for 100 parts by weight of the binder. For more details of these lubricants, see Japanese Patent Publication No. 23889/68, Japanese Patent Application Nos. 28647/67, 81543/68, U.S. Pat. No. 3,423,233, and Japanese Patent Publication No. 28043/72.

Examples of the abrasive are $Cr_2O_3$, $Al_2O_3$, and the compounds described in Canadian Patent No. 813,289.

The magnetic recording layer can be formed on a base from a magnetic paint comprising the ferromagnetic particles, binder and other additives by air doctor coating, blade coating, air knife coating, squeeze coating, impregnation coating, reverse roll coating, transfer roll coating, gravure coating, kiss coating, cast coating, and spray coating. Details of these and other useful coating techniques are described in "Coating Kogaku (Coating Engineering)," published by Asakura Shoten, Mar. 20, 1971, pp. 253-277.

The magnetic particles in the underlying layer are oriented in a magnetic field in the direction of the recording track (in most cases, the longitudinal direction of the web), whereas the particles in the outermost layer are not given any magnetic orientation and the magnetic susceptibility of the randomly filled magnetic particles in the vertical direction is utilized. Alternatively, the particles in the outermost layer are oriented in a direction normal to the surface of the web, so as to increase their magnetic susceptibility in the vertical direction. As will be described in the Examples hereinafter, in either case, the magnetic recording medium defined in this invention provide higher residual magnetic susceptibility in the vertical magnetizing direction as compared to a conventional magnetic recording medium having one magnetic recording layer of acicular magnetic particles, but an even better result is obtained by orienting the particles in the outermost layer in the vertical direction.

The outermost magnetic layer is required to have a thickness approximately equal to the recording wavelength, and in order to avoid self-demagnetization when it has residual magnetization in the vertical direction, the layer generally has a thickness of from about 0.1 to $3\mu$, and preferably from 0.3 to $1.5\mu$.

As will be understood from the Examples, the magnetic recording medium thus prepared according to this invention produces high output with low noise, and hence a high S/N ratio, at a short recording wavelength, e.g., at $1\mu$. Furthermore, the magnetic recording medium of the present invention has the sensitivity at long wavelengths several decibels higher than that of the magnetic recording medium whose magnetic layer is composed solely of the outermost layer thereof.

This invention is now described in greater detail by reference to experiments and examples, which are provided here for illustrative purposes only, and are not intended to limit the scope of the invention. In the Examples, all parts are by weight.

EXPERIMENT 1

Five groups of $\gamma$-$Fe_2O_3$ particles were prepared: their particle lengths were $0.5\mu$, $0.3\mu$, $0.25\mu$, $0.2\mu$ and $0.1\mu$, with the values of length to width ratio being 1.5, 2, 3, 5 and 10, respectively. The particle size and shape of the particles of each group were controlled by changing the conditions of crystallizing the particles of $\alpha$-FeOOH from which $\gamma$-$Fe_2O_3$ was prepared. For details of the preparation of these particles, see Japanese Patent Publication No. 21163/61 and Japanese Patent Application (OPI) No. 80999/75 (the symbol OPI as used herein means an unexamined published Japanese Patent Application). The magnetic particles prepared had a coercive force between 280 and 330 Oe. Coating solutions were prepared by mixing the magnetic particles with the following components in a ball mill in the amounts indicated below.

| | |
|---|---|
| $\gamma$-Fe$_2$O$_3$ | 100 parts |
| Vinyl chloride/vinyl acetate copolymer | 27 parts |
| Acrylic resin | 7 parts |
| Carbon black | 8 parts |
| Silicone oil | 1 part |
| Amyl stearate | 0.2 part |
| Methyl ethyl ketone | 180 parts |

The resulting dispersion was applied to a polyester base (22$\mu$ thick) until its dry thickness was 2$\mu$. The base with the magnetic coating was passed between magnetic poles that created a vertical magnetic field of 800 G while hot air was blown between the poles to achieve the greater part of the drying. The squareness ratio of each sample in a direction normal to the magnetic surface was measured with a vibrating flux meter of Toei Kogyo K.K. The results are shown in Table 1 from which one can see that the samples using particles having a length to width ratio of 3/1 or less achieved a greater squareness ratio after orientation than did particles having a ratio of 5/1 and 10/1.

TABLE 1

| Length | Length to Width Ratio | | | | |
|---|---|---|---|---|---|
| ($\mu$) | 10/1 | 5/1 | 3/1 | 2/1 | 1.5/1 |
| 0.5 | 0.33 | — | — | 0.35 | — |
| 0.3 | 0.33 | 0.35 | 0.38 | 0.38 | 0.38 |
| 0.25 | — | — | — | 0.38 | 0.38 |
| 0.2 | — | — | 0.39 | 0.39 | 0.39 |
| 0.1 | 0.35 | 0.37 | 0.39 | 0.39 | 0.39 |

[Note]
"—": not tested

EXPERIMENT 2

Particles of $\gamma$-Fe$_2$O$_3$ of the same type as used in Experiment 1 were reduced in a hydrogen stream at 330° C. to produce the corresponding metallic iron particles. Their shape was similar to that of the $\gamma$-Fe$_2$O$_3$ particles and their length was about 20% shorter than that of the latter. They had a coercive force of 900 to 1050 Oe. Magnetic recording materials were prepared from these particles as in Experiment 1. The results of measurement of the squareness ratio of each sample are set forth in Table 2, and they are similar to the results obtained in Experiment 1.

TABLE 2

| Length | Length to Width Ratio | | | | |
|---|---|---|---|---|---|
| ($\mu$) | 10/1 | 5/1 | 3/1 | 2/1 | 1.5/1 |
| 0.4 | 0.32 | — | — | 0.35 | — |
| 0.25 | 0.33 | 0.35 | 0.37 | 0.37 | 0.37 |
| 0.2 | — | — | — | 0.37 | 0.37 |
| 0.15 | — | — | 0.38 | 0.38 | 0.39 |
| 0.08 | 0.34 | 0.35 | 0.37 | 0.39 | 0.38 |

[Note]
"—": not tested

EXAMPLE 1

Particles of $\gamma$-Fe$_2$O$_3$ 0.5$\mu$ long and having a length to width ratio of 12/1 were mixed with the following components in a ball mill in the amounts indicated below.

| | |
|---|---|
| $\gamma$-Fe$_2$O$_3$ | 100 parts |
| Vinyl chloride/vinyl acetate copolymer | 15 parts |
| Epoxy resin | 7 parts |
| Polyamide resin | 5 parts |
| Carbon black | 7 parts |
| Oleic acid | 1 parts |
| Methyl ethyl ketone | 200 parts |

The resulting coating solution was applied to a polyester film (22$\mu$ thick) to obtain a layer having a dry thickness of 4$\mu$, and the magnetic particles in the magnetic coating were oriented in the longitudinal direction of the web. The web was dried and calendered. Coating solutions of the same type as prepared in Experiment 1 were applied to the magnetic layer as described above to obtain a layer having a dry thickness of 1$\mu$, and the coated webs were dried while passing through a vertical magnetic field as in Experiment 1. For comparison, a coated material referred to as Type No. 1 was prepared by forming an oriented coating having a dry thickness of 5$\mu$, made of only a single $\gamma$-Fe$_2$O$_3$ layer using the same formation employed in the underlying layer. A coated material referred to as Type No. 2 was prepared by forming a single $\gamma$-Fe$_2$O$_3$ layer (dry thickness: 5$\mu$; length to width ratio: 2/1; length indicated in Table 3) using the formulation employed in the outermost layer and by orienting the magnetic particles in a direction normal to the web surface. The web was then calendered and slit to $\frac{1}{2}$ inch wide.

The sensitivity of the resulting samples was measured, with Type No. 1 being used as a reference. For the sensitivity for recording at short wavelengths, the output and noise level at a recording wavelength of 1$\mu$ were measured with a helical VTR (video tape recorder). The ratio of the output in reproduction after recroding a 3 MHz sinewave signal to the noise level at 2 MHz was measured with a ferrite head (head gap: 0.2$\mu$) at a relative speed of head and tape of 2.9 m/sec. For recording at long wavelengths, the sensitivity at a recording wavelength of 100$\mu$ was measured with a ferrite head (head gap: 1.2$\mu$). The results of the measurement are shown in Table 3 below.

TABLE 3

| Length | | Length to Width Ratio | | | | | Type No. 2 | Type No. 1 |
|---|---|---|---|---|---|---|---|---|
| ($\mu$) | | 10/1 | 5/1 | 3/1 | 2/1 | 1.5/1 | | |
| 0.5 | A | +0.5 | — | — | 0 | — | 0 | 0 |
| | B | 0 | — | — | +0.5 | — | +0.5 | 0 |
| | C | 0 | — | — | 0 | — | −2 | 0 |
| 0.30 | A | 0 | 0 | — | +1.5 | +1.5 | +1 | |
| | B | +0.5 | +0.5 | — | +1 | +2 | +1 | |
| | C | −0.5 | 0 | — | 0 | 0 | −2 | |
| 0.25 | A | — | — | — | +4 | +4 | +3 | |
| | B | — | — | — | +3 | +4 | +2.5 | |
| | C | — | — | — | −0.5 | 0 | −3.5 | |
| 0.2 | A | — | — | +4 | +6 | +6 | +5 | |
| | B | — | — | +4 | +6 | +7 | +5.5 | |
| | C | — | — | +1 | 0 | −0.5 | −6 | |
| 0.10 | A | +2 | +3 | +4 | +6 | +6 | +6 | |
| | B | +1 | +2 | +4 | +6 | +7 | +7 | |
| | C | +1 | +1 | −1 | −0.5 | −0.5 | −6 | |

[Note]
A: output at a recording wavelength of 1$\mu$ (dB)
B: the ratio of output in A and noise level for a signal frequency 1 MHz less (dB)
C: output at a recording wavelength of 100$\mu$ (dB)
"—": Not tested
The same symbols having the same meanings are used in Tables 4 and 5.

As is clear from Table 3, the output at short wavelengths is increased when the length of the magnetic particles is 0.25μ or less and the length to width ratio is not larger than 3/1, and this result is similar to the data on squareness ratio set forth in Table 1. The noise level is decreased as the length of the particles and their length to width ratio are decreased. In consequence, the S/N ratio of the samples according to this invention is distinctly better than that of Type No. 1 when the particle size is 0.30μ or less and the length to width ratio is not greater than 3/1. Type No. 2, which used a single layer of γ-$Fe_2O_3$ particles having a length to width ratio of 2/1, had a sensitivity at short wavelengths almost equal to that of the corresponding samples of this invention, but its sensitivity at long wavelengths was very low. The samples of this invention using a two-layered magnetic coating have good sensitivity at both short and long wavelengths, as well as high S/N ratio. This is very advantageous for a magnetic recording medium of the type that is required to have high sensitivity for all frequency spectra.

EXAMPLE 2

Magnetic recording materials were prepared as in Example 1, except that the outermost layer was made of the metallic iron particles described in Experiment 2 and that the underlying layer was made of metallic iron particles 0.4μ long and having a length to width ratio of 12/1. Types No. 1 and No. 2 were prepared as in Example 1. The sensitivity at short and long wavelengths, as well as the S/N ratio of the samples, are identified in Table 4 below.

TABLE 4

| Length (μ) | | Length to width Ratio | | | | Type* No. 2' | Type No. 1' |
|---|---|---|---|---|---|---|---|
| | | 10/1 | 5/1 | 3/1 | 2/1 | | |
| 0.4 | A | 0 | — | — | +0.5 | 0 | 0 |
| | B | 0 | — | — | +1 | +0.5 | 0 |
| | C | −1 | — | — | 0 | −1 | 0 |
| 0.25 | A | 0 | +0.5 | +3 | +1.5 | +1 | |
| | B | +1 | +1.5 | +3 | +2 | +2 | |
| | C | −0.5 | 0 | +0.5 | +0.5 | −2 | |
| 0.2 | A | — | — | — | +4 | +4 | |
| | B | — | — | — | +5 | +4 | |
| | C | — | — | — | +0.5 | −3 | |

[Note]
*The length to width ratio was 2/1.
"—": not tested.

EXAMPLE 3

Particles of γ-$Fe_2O_3$ were prepared from goethite as in Example 1, except that Co-ion was co-precipitated in the last stage of the goethite growth and that the amount of Co was changed to provide a coercive force between 650 and 600 Oe. Tape samples were made as in Example 1 and their output at long and short wavelengths, as well as the S/N ratio, were measured, and the results are shown in Table 5.

TABLE 5

| Length (μ) | | Length to Width Ratio | | | | Type* No. 2" | Type No. 1" |
|---|---|---|---|---|---|---|---|
| | | 10/1 | 5/1 | 3/1 | 2/1 | | |
| 0.5 | A | 0 | — | — | +0.5 | +0.5 | 0 |
| | B | 0 | — | — | +0.5 | 0 | 0 |
| | C | −1 | — | — | 0 | −1 | 0 |
| 0.3 | A | 0 | 0 | +2 | +3 | +3 | |
| | B | +0.5 | +1 | +3 | +3 | +2 | |
| | C | +0.5 | 0 | +0.5 | +0.5 | −3 | |
| 0.2 | A | — | — | — | +5 | +4 | |
| | B | — | — | — | +4.5 | +4 | |
| | C | — | — | — | +0.5 | −5 | |

[Note]
*The length to width ratio was 2/1.
"—": not tested.

The advantages of this invention with respect to γ-$Fe_2O_3$ and alloy particles have been described in Examples 1 to 3, and similar results are obtained for $CrO_2$ particles, as well as for the particles of Co-modified iron oxide prepared by a method other than that used in Example 3. The combination of the magnetic materials in the outermost layer and underlying layer may be varied; for instance, the outermost layer may be made of alloy particles, and the underlying layer of Co-modified iron oxide particles. In the Examples, the magnetic particles in the outermost layer were oriented in a vertical direction. Even if the degree of orientation of the particles in a vertical direction is insufficient and orientation in a horizontal direction is not carried out, the fine particles having the length and the length to width ratio defined in this invention retain a fairly large squareness ratio in a vertical direction as obtained in Experiments 1 and 2. In Examples 1 and 3, the underlying layer used γ-$Fe_2O_3$ particles and in Example 2, the underlying layer used metallic iron particles. Similar results are obtained when Co-modified iron oxide, $CrO_2$ or alloy particles are used in the underlying layer. In this case, the output in low-density recording can be effectively increased by making the coercive force of the underlying layer smaller than that of the outermost layer.

While the invention has been described in detail and with reference to specific embodiments thereof, it will be apparent to one skilled in the art that various changes and modifications can be made therein without departing from the spirit and scope thereof.

What is claimed is:

1. A magnetic recording medium having formed on a non-magnetic base at least two magnetic layers, each comprising ferromagnetic particles dispersed in a binder, wherein the ferromagnetic particles in the outermost magnetic layer have an average length of 0.3μ or less and a length to width ratio greater than 1/1 but not greater than 3/1, and the ferromagnetic particles in an underlying magnetic layer have a length to width ratio of more than 3/1.

2. A magnetic recording medium as in claim 1, wherein the outermost magnetic layer has a thickness of from about 0.1 to 3μ.

3. A magnetic recording medium as in claim 1, wherein the outermost magnetic layer has a thickness of from 0.3 to 1.5μ.

* * * * *